Nov. 14, 1961  N. M. CLARK  3,008,296
TURBINE POWER PLANT
Filed Aug. 15, 1960  2 Sheets-Sheet 2

INVENTOR
Neil Milligan Clark
BY
Stevens Davis Miller & Mosher
ATTORNEYS

United States Patent Office 3,008,296
Patented Nov. 14, 1961

3,008,296
TURBINE POWER PLANT
Neil Milligan Clark, Farnborough, England, assignor to Power Jets (Research & Development) Limited, London, England, a British company
Filed Aug. 15, 1960, Ser. No. 49,514
Claims priority, application Great Britain Aug. 20, 1959
8 Claims. (Cl. 60—102)

This invention relates to turbine power plants for propulsion purposes and particularly, but not exclusively to turbine power transmission systems for marine propulsion.

One of the problems of providing a turbine power plant for marine propulsion lies in the requirements for reversing the direction of rotation of the propeller. Reversible pitch propellers, separate electric reverse drives, and reversing gears are known for this purpose. It has also been proposed to mount a reverse propulsion turbine and a forward propulsion turbine on the same shaft and to provide in this case control arrangements for transferring working fluid from one to the other. With such an arrangement, when ahead propulsion is required, the reverse propulsion turbine is rotated idly by the forward propulsion turbine. Idling rotation results in losses mainly due to windage, these losses being a serious disadvantage with this system since the vessel normally travels ahead.

A marine application of the present invention is concerned with a turbine power plant in which reversing is facilitated without having the recourse to gear or pitch changing mechanisms and without having the reverse propulsion turbine idling when the vessel is proceeding ahead.

Turbine power plants according to the present invention include a forward propulsion turbine which is operable to produce driving power when rotationally independent of a reverse propulsion turbine, the plant being arranged in such a manner that uni-directional substantially synchronous rotation is obtained before the reverse propulsion turbine is operable to produce driving power.

The invention further provides a turbine power plant including a forward propulsion turbine and a reverse propulsion turbine the forward turbine normally rotating independently of the reverse turbine, means to accelerate the reverse turbine in the same direction as that of the forward turbine, a clutch arrangement operable to establish a driving connection between the two turbines when their rotational speeds have been substantially synchronised and valve controlled duct means operable to transfer working fluid from the forward turbine to the reverse turbine to change the direction of rotation of the reverse turbine.

The means to accelerate the reverse turbine may include an auxiliary duct through which a part of the working fluid from upstream of the forward propulsion turbine is diverted and reverse turbine inlet nozzles which are positioned to receive the diverted working fluid and rotate the reverse turbine in the same direction as the forward turbine. The reverse turbine may further include inlet nozzles to supply working fluid for rotating the reverse turbine in its driving direction. The reverse propulsion turbine is preferably of the radial flow type and the forward propulsion turbine is desirably of the axial flow type. The diverted working fluid flow through the auxiliary duct is controlled by an auxiliary valve which is also operable to shut off this flow to the reverse turbine inlet nozzles when the rotational speeds of the turbines have been substantially synchronised.

In an alternative arrangement, the means operable to accelerate the reverse propulsion turbine to the required rotational speed may be a fluid coupling. In a modification of this arrangement, a friction clutch can be associated with the fluid coupling.

Several embodiments of the invention will now be described, by way of example only, with reference to the accompanying drawings, in which.

Figure 1:
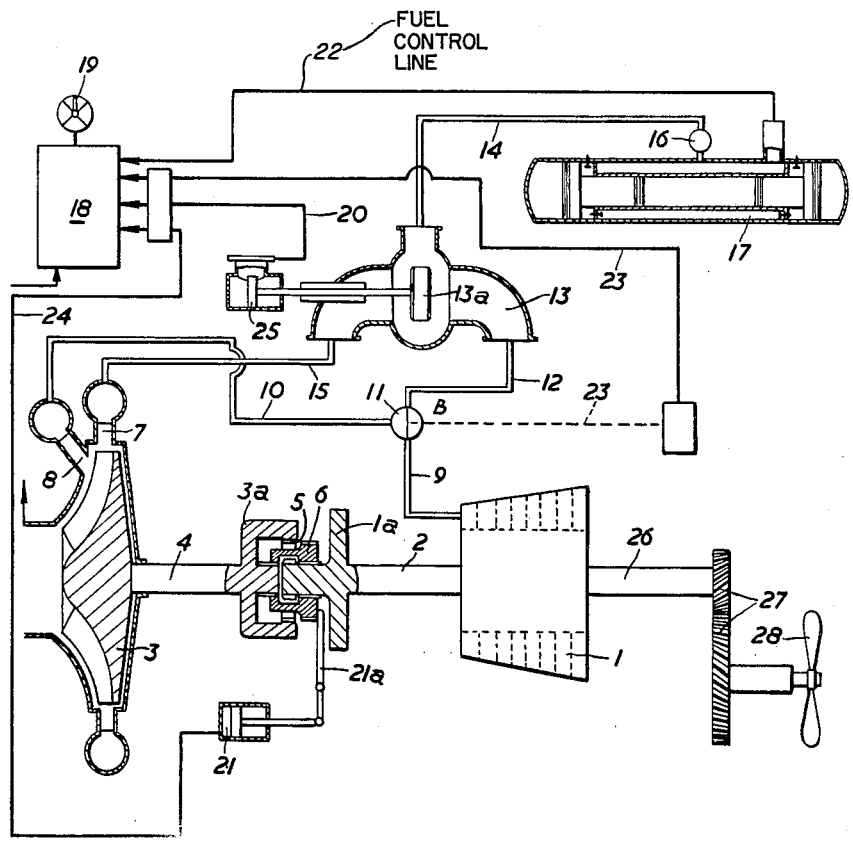
FIGURE 1 shows a preferred embodiment of the invention with associated reversing means, controls and working fluid supply arrangements intended for marine applications.

FIGURE 1 shows a forward propulsion turbine, here in the form of an ahead turbine 1 of the axial flow type. The turbine 1 is mounted for driving on a shaft 2 which is provided with a part 1a of a synchronous clutch. The reverse propulsion turbine here in the form of an astern turbine 3 is of the radially inward flow type and has an output shaft 4 which is provided with a part 3a of the synchronous coupling complementary to the part 1a. The part 3a of the coupling has teeth 5 which co-operate with teeth 6 on the part 1a of the coupling to establish a driving connection. The coupling is of a type such that the parts 1a and 3a are in driving engagement whenever the rotational speed of the astern turbine 3 is higher than the rotational speed of the ahead turbine 1 (both rotating in the ahead direction). The astern turbine 3 is provided with primary inlet nozzles 7 and an auxiliary inlet nozzle 8. The ahead turbine 1 has inlet ducting 9 for the supply of working fluid. Ducting 10 connects the auxiliary nozzle 8 to the inlet ducting 9, of the ahead turbine 1, through an auxiliary valve 11. The auxiliary valve 11 is also connected by ducting 12 to one side of a proportioning valve 13 which includes a moving part 13A. The proportioning valve 13 is also connected by ducting 15 to the primary inlet nozzle 7 of the astern turbine 3. Working fluid is supplied to the proportioning valve 13 via ducting 14 from a reservoir 16 supplied from a free-piston engine gasifier shown generally at 17. An output shaft 26 is connected to the ahead turbine 1 and drives a propeller 28 via gearing 27.

A control console, or ship's telegraph, 18 dependent on the setting of an arm 19 controls via an oil line 20 the operation of the main proportioning valve 13. There is also a control line 22 for the purpose of increasing the rate of fuel supplied to the free-piston gasifier 17 and a control line 23 to set the position of the auxiliary valve 11. Lastly, the console 18 controls via line 24 the operation of a locking mechanism 21 and 21a for the clutch 3a and 1a.

In another form of the turbine power plant, the primary inlet nozzles 7 may be pivoted so as to direct working fluid into the rotor initially in a direction such that the rotor rotates in a direction opposite to its normal driving direction. Such an arrangement, which is not illustrated, will not require the auxiliary inlet nozzle 8.

Figure 2:
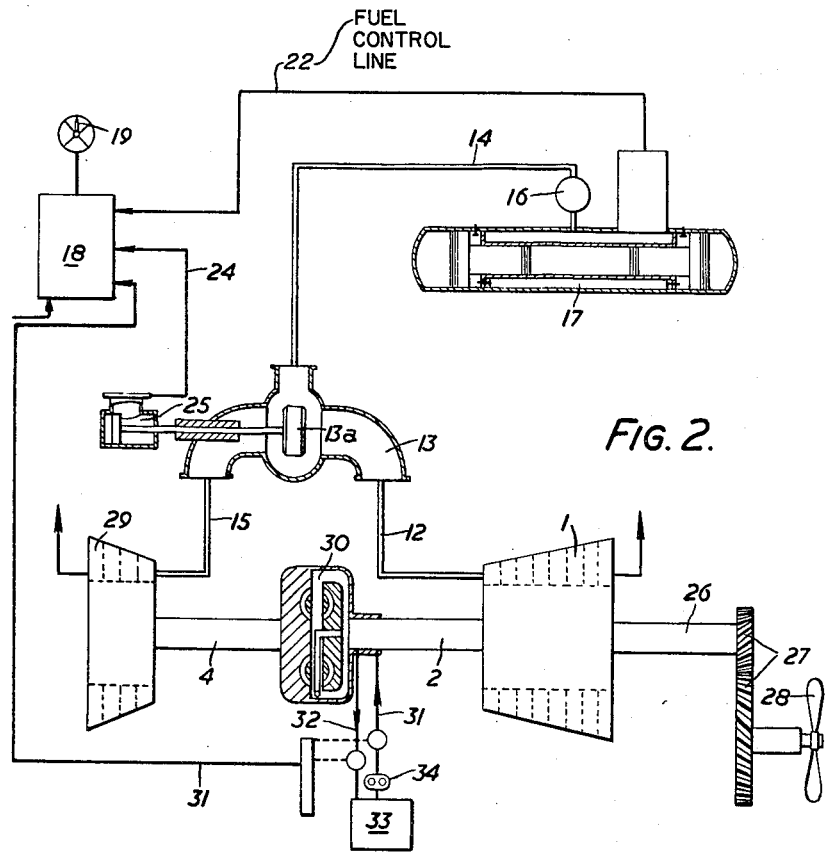
FIGURE 2 shows an alternative embodiment with a different reversing arrangement.

FIGURE 2 shows an embodiment generally similar to that shown in FIGURE 1 and the same reference numerals are used for identical parts. Instead of a radial astern turbine however, an axial flow astern turbine 29 is provided and instead of the synchronous clutch 3a and 1a, a fluid coupling 30 is provided. In this embodiment, there are no equivalents of the auxiliary nozzle 8, the auxiliary ducting 10, the auxiliary valve 11 or the locking mechanism 21 which was provided for locking the synchronous clutch. Oil is pumped into the fluid coupling 30 by a pump 34 from an oil tank 33 through a pipe 31. Oil can be removed through a drain line 32 in the oil tank 33.

Figure 2A:
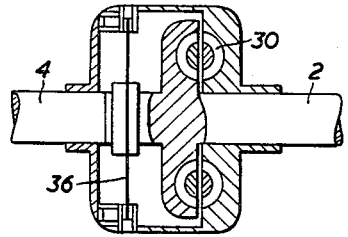
FIGURE 2A shows a coupling arrangement alternative to the arrangement shown in FIGURE 2.

FIGURE 2A shows how the fluid coupling 30 of FIG-

URE 2 could be modified to include a friction clutch 36. The fluid coupling serves to accelerate the reverse turbine 29 up to a speed approaching that of the ahead turbine 1 so that the friction clutch 36 may be brought into engagement without serious slip. The friction clutch 36, once engaged, transmits the full torque of the reverse turbine 29.

Figure 3:
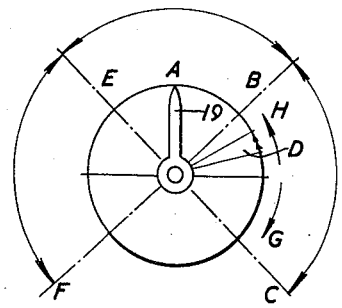
FIGURE 3 shows a control sequence either for the embodiment shown in FIGURE 1 or FIGURE 2 and will be referred to particularly in connection with the description of the operation of these embodiments.

The operation of the power transmission system as shown in FIGURE 1 will now be described with reference to FIGURE 3. FIGURE 3 shows the control arm 19 rotatable from a point C (full ahead) to a point F (full astern). The middle position A is the stop position. Whilst proceeding from the middle position A toward the full ahead direction over the portion AB, the free-piston gasifier 17 is idling and the part 13A of proportioning valve 13 is positioned to allow progressively more working fluid into the ahead turbine 1. After the position B, the fuel supply to the free-piston gasifier is increased by means of the control line 22 and the speed can then be increased to the full ahead position C. Whilst moving the control arm 19 in an anti-clockwise direction from position C, the first control measure to be taken is at a point D at which the lock 21 is energised for the synchronous clutch 1a, 3a. At the position D, the auxiliary valve 11 diverts working fluid from the ahead turbine 1 to the astern turbine 3 via the auxiliary nozzle 8. The diverted working fluid which issues from the auxiliary nozzle 8 rotates the astern turbine 3 in the same direction as that of the ahead turbine 1. Synchronisation of the turbines 3 and 1 then takes place and the teeth 5 and 6 of the clutch 1a and 3a establish a driving connection between the turbines. The driving connection is locked by the locking arrangement 21 and 21a and the control line 23 returns the auxiliary valve 11 to a position which shuts off the supply of working fluid to the reverse propulsion turbine via the auxiliary nozzle 8. The locking arrangement 21 and 21a cannot force the clutch parts into engagement but prevents them disengaging. Movement of the control arm 19 in an anti-clockwise direction to the position E places the part 13A of proportioning valve 13 in such a position as to allow working fluid to flow through the duct 15 to the inlet nozzles 7 of the astern turbine 3 and shut off the working fluid supply via ducts 12 and 9 to the ahead turbine 1. The working fluid issuing from the inlet nozzles 7 reverses the direction of rotation of the astern turbine 3 which is then driving the propeller 28 via the ahead turbine 1. Consequently, after the point E, the fuel supply to the free-piston gasifier 17 can be increased and speed increased to full speed astern at position F.

The operation of the power transmission system as shown in FIGURE 2 will now be described with reference to FIGURE 3. Starting from the stop position A moving toward the full ahead position C, the part 13A of the proportioning valve 13 is positioned to allow progressively more working fluid to flow to the ahead turbine 1 via the duct 12. After the position B, the fluid coupling 30 is emptied and drained into the oil tank 33 and from this point the speed can be increased up to the full ahead position C. From the full ahead position C and moving the control arm 19 anti-clockwise the fuel supply of the free-piston gasifier is reduced by means of the control line 22. At a position H, the coupling is charged with oil. Thus the astern turbine 3 is driven in the same direction as that of the ahead turbine 1 and eventually synchronised with the rotation of the ahead turbine 1. From the position B to the position E, the part 13A of proportioning valve 13 is positioned to admit progressively more working fluid to the astern turbine 29 and the fluid supply to the ahead turbine 1 is shut off. Thus the direction of rotation of the astern turbine 3 is reversed, and the astern turbine 3 is then driving the propeller 28 via the ahead turbine 1. From the position E, the astern turbine can be run up to full speed at the point F by increasing fuel input to the free-piston gasifier 17.

I claim:
1. Turbine power plant including a forward propulsion turbine and a reverse propulsion turbine, the forward turbine normally rotating independently of the reverse turbine, means to accelerate the reverse turbine in the same direction as that of the forward turbine, a coupling arrangement operable to establish a driving connection between the two turbines when their rotational speeds have been substantially synchronised and valve-controlled duct means operable to transfer working fluid from the forward turbine to the reverse turbine to change the direction of the reverse turbine.

2. Turbine power plant as claimed in claim 1, in which the means to accelerate the reverse turbine includes an auxiliary duct through which a part of the working fluid from upstream of the forward propulsion turbine is diverted and reverse turbine inlet nozzles which are positioned to receive the diverted working fluid and to rotate the reverse turbine in the same direction as the forward turbine.

3. Turbine power plant as claimed in claim 2, in which the reverse turbine further includes inlet nozzles to supply working fluid for rotating the reverse turbine in its driving direction.

4. Turbine power plant as claimed in claim 2, in which the reverse turbine is of the radial flow type.

5. Turbine power plant as claimed in claim 2, in which the diverted working fluid flow through the auxiliary duct is controlled by an auxiliary valve which is also operable to shut off this flow to the reverse turbine inlet nozzles when the rotational speeds of the turbines are substantially synchronised.

6. Turbine power plant as claimed in claim 5 further including a working fluid generator arranged to supply working fluid to the turbines through the valve controlled duct means, a locking mechanism for the coupling arrangement to lock in the driving connection between the two turbines and a control arrangement having control lines connected to the locking mechanism, the working fluid generator, the valve controlled duct means and the auxiliary valve, whereby at predetermined settings the operation of either turbine as well as the transfer of working fluid from one turbine to the other is controlled and the synchronisation of the turbines and the operation of the locking mechanism is effected.

7. Turbine power plant including a forward propulsion turbine and a reverse propulsion turbine, the forward turbine normally rotating independently of the reverse turbine, a transmission device between the forward and reverse propulsion turbine, the transmission device being operable to couple the turbines and accelerate the reverse propulsion turbine in the same direction as that of the forward propulsion turbine, so that the rotational speeds of the turbines are synchronised, and valve controlled duct means, the valve controlled duct means being operable to transfer working fluid from the forward turbine to the reverse turbine and change the direction of the reverse turbine.

8. Turbine power plant as claimed in claim 7, in which the transmission device is a fluid coupling and further comprises, a friction clutch operable to transmit driving power between the reverse propulsion turbine and the forward propulsion turbine when the rotational speeds of the turbines have been substantially synchronized.

References Cited in the file of this patent

UNITED STATES PATENTS

| | | |
|---|---|---|
| 2,515,962 | May | July 18, 1950 |
| 2,567,581 | Salter | Sept. 11, 1951 |